Aug. 2, 1932.  B. T. ANDREN  1,869,535
SWIVEL STOOL
Filed Oct. 10, 1931
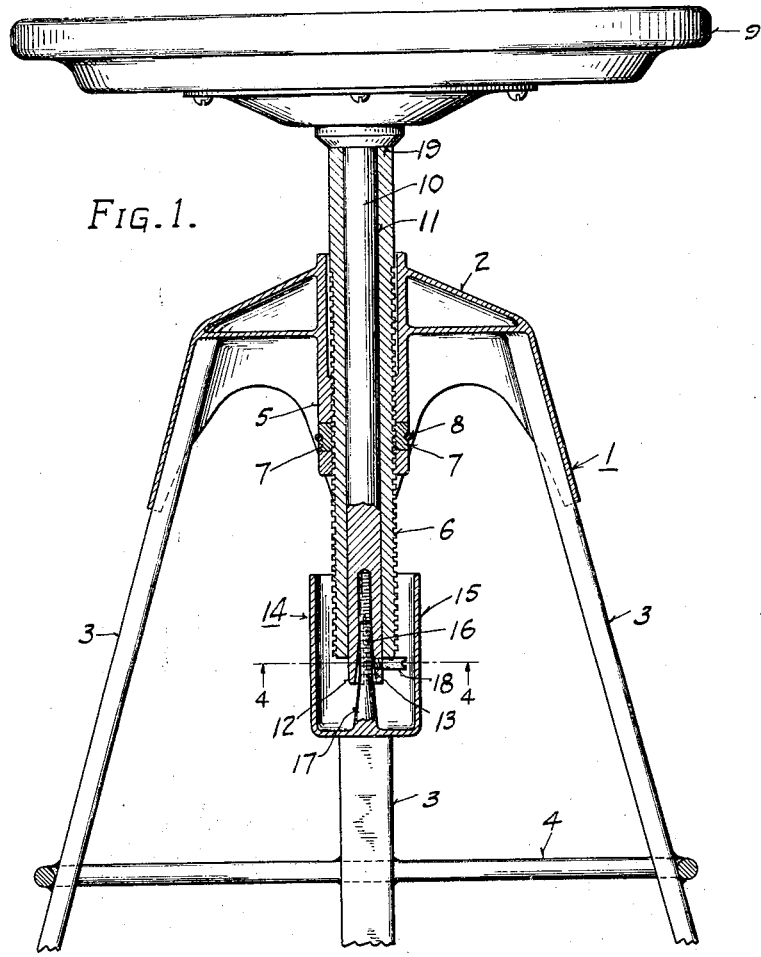
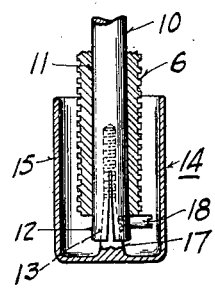
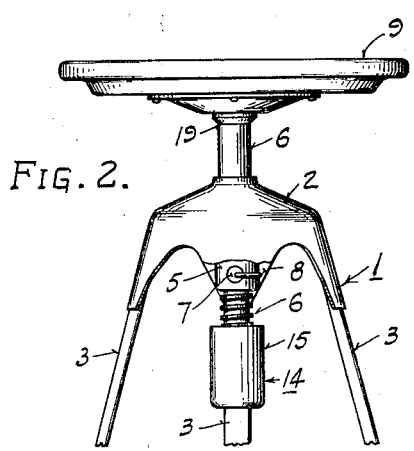
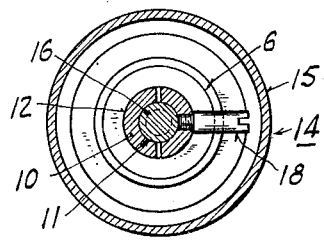
INVENTOR.
Birger T. Andren
BY
ATTORNEY.

Patented Aug. 2, 1932

1,869,535

UNITED STATES PATENT OFFICE

BIRGER TORVALD ANDREN, OF MILWAUKEE, WISCONSIN, ASSIGNOR TO A. O. SMITH CORPORATION, OF MILWAUKEE, WISCONSIN, A CORPORATION OF NEW YORK

SWIVEL STOOL

Application filed October 10, 1931. Serial No. 568,052.

The present invention relates to a swivel stool.

An object of the invention is to provide for vertical adjustment of the seat of a swivel stool.

Another object is to provide for rotation of the seat of a stool while maintaining a constant vertical position.

In the accompanying drawing:

Figure 1 is a view partly in section and partly in side elevation of a stool constructed in accordance with my invention.

Fig. 2 is a view in side elevation illustrating features of construction.

Fig. 3 is a vertical sectional view of the hand nut.

Fig. 4 is a sectional view taken on the line 4—4 of Fig. 1.

The stool has a base 1 comprising a central hub 2 formed of pressed metal to which are welded the legs 3. Conveniently located near the bottom of the stool is a reenforcing ring and foot rest 4. In the center of the base is in internally threaded sleeve 5 welded or otherwise secured to the pressed metal hub. A hollow screw 6 is threaded externally to cooperate with the threads of the sleeve. The sleeve 5 is provided with a pair of removable friction plugs 7 threaded upon the inside and adapted to apply pressure against the hollow screw 6 to prevent turning of the screw and permit free rotation of the seat when the vertical position thereof is satisfactory. The friction plugs 7 are held in place and are held against the screw 6 under pressure by means of a spring 8 suitably secured to the backs of the plugs.

The seat 9 of the stool is provided with a spindle base 10 of such dimensions as to pass through the opening 11 in the hollow screw 6. The lower end 12 of the spindle is split and has a tapered opening 13 extending for a relatively short distance along the longitudinal axis of the spindle. The upper portion of the opening 13 is threaded. The purpose of the opening is to accommodate the hand nut 14 by means of which vertical adjustment of the spindle 10 and seat 9 is effected. The hand nut 14 comprises a cup-shaped shell 15 into which a bolt 16 with a tapered base 17 is concentrically secured. The bolt is threaded to fit into the threaded opening 13 in the end of the spindle and the tapered base 17 is adapted to engage the tapered portion of the opening 13 to spread the split end 12 of the spindle 10. The end of the spindle is provided with a stop screw 18 which prevents the spindle from being withdrawn from the hollow screw 6 when the stool is picked up by the seat.

The operation of the stool is as follows:

In normal use, when the vertical adjustment of the seat is satisfactory to the user, the hand nut 14 is in the position shown in Fig. 1 with the tapered base 17 out of engagement with the tapered portion of the split nut 12 of the spindle 10. In this position there is no restriction upon the rotation of the spindle 10 within the hollow screw 6 so that the user of the stool may turn the seat without affecting its vertical position. If, however, the vertical position is not satisfactory, the hand nut 14 is turned so that the tapered base 17 of the bolt 16 within said hand nut is drawn upwardly into the tapered opening 13, thereby expanding the split end 12 of the spindle 10 causing it to engage the inner surface of the hollow screw 6. Any rotation then of the seat causes the screw 6 to turn within the internally threaded sleeve 5 and the vertical adjustment, whether up or down, is under direct control of the user merely by turning the seat to the left or right as he chooses.

The construction described may be modified by placing a ball bearing between the upper end of the screw 6 and a shoulder 19 provided at the top of the spindle 10, to permit the seat 9 to rotate freely without rotating the screw 6. This modification tends to reduce the chances of accidental rotation of the screw 6 when vertical adjustment is not wanted. Other friction plugs than those described above may be used and it is understood that various constructions may be applied to the stool without departing from the spirit and scope of the appended claims.

I claim:

1. A swivel stool comprising a pedestal, a swivel seat rotatably mounted on the pedestal, means for adjusting the seat vertically relative to the pedestal, the adjusting means being disposed between the pedestal and seat, and means comprising a hand actuated expansion member for connecting the adjusting means to and disconnecting it from the seat, the adjusting means being disposed for actuation by the rotation of the seat.

2. In a swivel stool, in combination, a pedestal, a swivel seat carried by the pedestal, a threaded sleeve interposed between the seat and pedestal, the sleeve making threaded engagement with the pedestal, and friction means carried by the swivel seat for connecting the seat to the sleeve, the seat serving as a means for actuating the sleeve.

3. In a swivel stool, in combination, a pedestal, an internally threaded socket carried by the pedestal, an externally threaded sleeve making threaded engagement in the socket, the sleeve being thereby disposed for movement along vertical lines when it is rotated in the socket, a seat carried by the sleeve, and means for connecting the sleeve to the seat in frictional engagement to provide for rotating it.

4. In a swivel stool, in combination, a pedestal, an internally threaded socket carried by the pedestal, an externally threaded sleeve making threaded engagement in the socket, the sleeve being thereby disposed for movement along vertical lines when it is rotated in the socket, a seat carried by the sleeve, means for connecting the sleeve to the seat to provide for rotating it, and friction elements for holding the sleeve against rotation when the seat is disconnected from it, thereby to permit free rotation of the seat at any desired level.

5. In a swivel stool, in combination, a pedestal, an internally threaded socket carried by the pedestal, an externally threaded sleeve making threaded engagement in the socket, the sleeve being thereby disposed for movement along vertical lines when it is rotated in the socket, a spindle carrying a seat and supported by the sleeve, and means for expanding a portion of the spindle into frictional engagement with the sleeve to connect said sleeve and seat to provide for vertical adjustment of the seat.

6. In a swivel stool, in combination, a pedestal, an internally threaded socket carried by the pedestal, an externally threaded sleeve making threaded engagement in the socket, the sleeve being thereby disposed for vertical adjustment when it is rotated in the socket, a spindle carrying a seat disposed within the sleeve, means carried by the spindle to expand a portion thereof into frictional engagement with the sleeve to provide for rotation of the sleeve, and friction means bearing upon the sleeve to prevent rotation thereof when the spindle is disconnected from it, thereby to permit unrestricted rotation of the seat at any desired level.

In witness whereof I have hereunto signed my name at Milwaukee, Wisconsin, this 7th day of Oct., 1931.

BIRGER TORVALD ANDREN.